A. FRENCH.

Assignor to A. French & Co.

MANUFACTURE OF ELLIPTIC SPRINGS.

No. 7,660. Reissued May 8, 1877.

Witnesses
J. J. Weisel
C. L. Parker.

Inventor
Aaron French
By Attorney George H. Christy
for him and his Assignees.

UNITED STATES PATENT OFFICE

AARON FRENCH, OF PITTSBURG, PENNSYLVANIA, ASSIGNOR TO A. FRENCH & CO., OF SAME PLACE.

IMPROVEMENT IN THE MANUFACTURE OF ELLIPTIC SPRINGS.

Specification forming part of Letters Patent No. 186,999, dated February 6, 1877; reissue No. 7,660, dated May 8, 1877; application filed March 29, 1877.

*To all whom it may concern:*

Be it known that I, AARON FRENCH, of Pittsburg, county of Allegheny, State of Pennsylvania, have invented or discovered a new and useful Improvement in Manufacture of Elliptic Springs; and I do hereby declare the following to be a full, clear, concise, and exact description thereof, reference being had to the accompanying drawing, making a part of this specification, in which—like letters indicating like parts—

Figure 1:
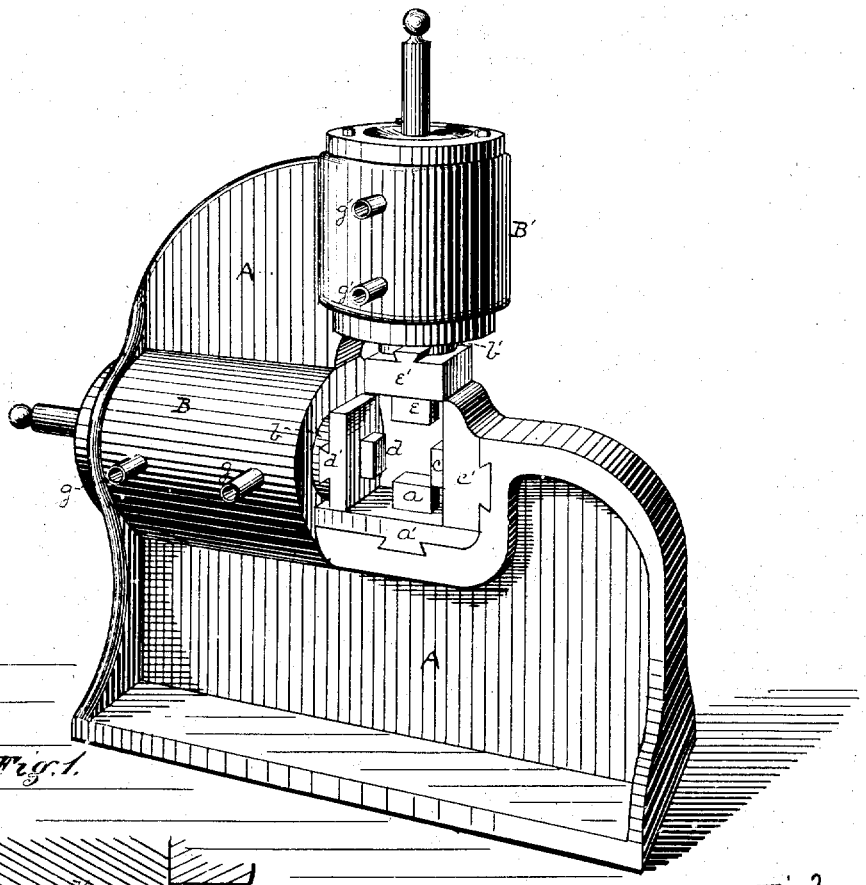
Figure 2:
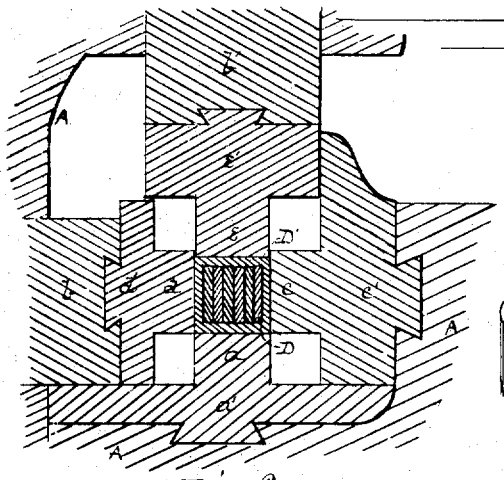
Figure 3:
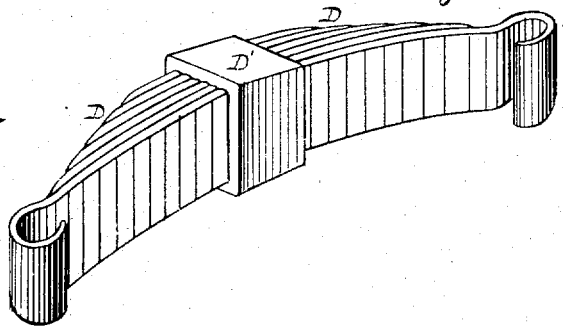

Figure 1 is a perspective view of my improved machine. Fig. 2 is a vertical sectional view through the dies and product or thing operated on, while the former are closed on the latter. Fig. 3 shows the product in perspective.

In the manufacture of elliptic or semi-elliptic leaf-springs, particularly the heavier sizes, such as are designed for railroad-car use, a solid welded band has to be placed around the several leaves of the spring, at each extremity of the minor axis of the ellipse. This band has heretofore, after being cut, bent, welded, and slipped loosely on, been tightened onto the spring by hammering, first, two opposite faces, and then giving the half-spring a quarter-turn, hammering the two other opposite faces, (one, of course, resting on a die and the other being struck by a hammer,) and so on alternately until the band was thought to be properly tightened. I have found, however, that this mode of tightening spring-bands does not in all cases give a satisfactory result, since the swaging action on two sides tends to force the two other sides away from the spring, and to that extent prevent the attainment of the desired result, and rarely, if ever, in springs having hammered bands, are the leaves of the spring clamped both on their flat faces and along the entire length of so much of their edges as come within the band, as to prevent one or more of them from being more or less loose within the band. I have hence invented a hydraulic press, which gripes the band on all its four lateral faces simultaneously, and compresses the band onto the spring from all sides at once, or first on two opposite sides, and then, while still held under pressure on such two sides, on its two other opposite sides, so that thereby the leaves composing each half-spring shall be firmly and securely locked as against displacement in any direction. The dies employed in this operation are removable, so that, other dies being substituted, the operation referred to may, by the use of a single machine, be employed on bands and springs of all sizes.

The frame of the machine A is of any suitable form or construction with reference to the ends in view. It carries two fixed dies, *a c*, by means of die-blocks *a′ c′*, or in other suitable way. The faces of these dies stand at right angles to each other, so as to form two adjacent sides of an open-ended die-box, and the areas of such faces are such as to cover two adjacent faces of the band D′. The other two sides of the open-ended die-box consist of the movable dies *d e*, having a like arrangement of faces, and attached by die blocks *d′ e′*, or in other suitable way, to the plungers *b b′* of the hydraulic cylinders B B′, the latter being mounted on or made as a part of the frame A, and in the proper position for the advance and back movement of the dies *d e*.

The water-pressure is applied and regulated by means of pipes *g g g′ g′*, and the proper arrangement of cocks.

The middle section or portion of the leaves of one-half of an elliptic car-spring (the number of the leaves not being material) are represented at D, and the band referred to at D′. The latter is cut, bent, and welded in the usual or any desired way, and, being properly heated, is slipped loosely onto the half-spring D. The dies *d e* being at the end of their back stroke the spring and band are placed within the two faces of the latter against the dies *a c*, as shown in Fig. 2. Pressure is then applied back of the pistons which actuate the plungers *b b′*, so that the dies *d e* advance against the other two faces of the band, as shown in Fig. 2, and by a continuation of the pressure compress the band so that it shall be caused to embrace the spring tightly and securely on all sides, not only on the outer faces of the top and bottom leaves, but also along so much of the edge of each leaf as comes within the band. These dies *d e* may for this purpose be caused to advance and act compressively both at the same time, or one may so act in advance of the other, retaining, however, its gripe until such other has also done its work. Then, by a reversal of the pressure, both are caused to move back, the product is removed, and the operation is repeated on another band. The work thus produced is vastly superior in its quality to any heretofore made, not only in the fact that the band gripes the leaves of the spring so tightly that they cannot be or become loose or liable to displacement in any direction, but also in the fact that the external face of the band is left with a smooth finish on its bearing sides, and with well-filled angular corners, such as cannot be secured by other known modes of manipulation. Such a spring and band will work better in use and give better results when combined with a carbody than any other like device yet made.

As shown in the drawing, the die-blocks which carry the dies are, by the use of a dovetail joint, made removable, so that dies for other sizes of bands may be inserted. Other known means of attaching and detaching such dies may, however, be substituted.

The spring thus banded, in what I believe to be its best form for practical use, will be claimed in a separate patent.

I claim herein as my invention—

1. An improvement in the art of compressing bands onto leaf-springs by subjecting the heated bands, after being slipped loosely onto the springs, to the action of dies simultaneously operative on the four outer faces of the band, whereby the top and bottom sides of the band are by one pair of dies caused to hold the leaves tightly together, and the other two sides of the band are by the other pair of dies caused to engage or lock on the edges of the leaves of the spring, substantially as set forth.

2. Two fixed dies, *a c*, and two moving dies, *d e*, arranged to form the four sides of an open-ended die-box, in combination with pressure-cylinders B B′, arranged, to operate the movable dies simultaneously in compressing spring-bands, substantially as set forth.

In witness whereof I have hereunto set my hand.

AARON FRENCH.

Witnesses:
J. J. McCORMICK,
CLAUDIUS L. PARKER.